United States Patent
De Palma et al.

(10) Patent No.: US 9,972,843 B2
(45) Date of Patent: May 15, 2018

(54) CARBONATE PRECURSORS FOR HIGH LITHIUM AND MANGANESE CONTAINING CATHODE MATERIALS

(71) Applicants: Umicore, Brussels (BE); Umicore Korea Ltd., Chungnam (KR)

(72) Inventors: Randy De Palma, Seoul (KR); JiHye Kim, Cheonan (KR); Kris Driesen, Hasselt (BE); Jens Paulsen, Daejeon (KR); Jin Hu, Antwerp (BE)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 102 days.

(21) Appl. No.: 14/915,281

(22) PCT Filed: Aug. 21, 2014

(86) PCT No.: PCT/IB2014/064000
§ 371 (c)(1),
(2) Date: Feb. 29, 2016

(87) PCT Pub. No.: WO2015/033246
PCT Pub. Date: Mar. 12, 2015

(65) Prior Publication Data
US 2016/0218361 A1 Jul. 28, 2016

(30) Foreign Application Priority Data

Sep. 5, 2013 (EP) .................................... 13183081
Mar. 27, 2014 (EP) .................................... 14161878

(51) Int. Cl.
*H01M 4/00* (2006.01)
*H01M 4/505* (2010.01)
*C01G 53/00* (2006.01)
*H01M 4/02* (2006.01)

(52) U.S. Cl.
CPC .......... *H01M 4/505* (2013.01); *C01G 53/006* (2013.01); *C01G 53/44* (2013.01); *C01P 2002/72* (2013.01); *C01P 2004/51* (2013.01); *C01P 2004/61* (2013.01); *C01P 2006/11* (2013.01); *C01P 2006/12* (2013.01); *H01M 2004/028* (2013.01)

(58) Field of Classification Search
CPC ....... H01M 4/525; H01M 4/505; C01B 31/24; C01B 32/60; C01B 17/98; C01G 53/00; C01D 15/00

USPC ...... 252/519.14, 514.15, 519.4, 521.2, 519.1
See application file for complete search history.

(56) References Cited

U.S. PATENT DOCUMENTS

| | | |
|---|---|---|
| 7,767,189 B2 | 8/2010 | Liu |
| 8,173,301 B2* | 5/2012 | Hiratsuka ............. H01M 4/366 423/594.3 |
| 8,303,855 B2* | 11/2012 | Paulsen ................ C01G 53/006 252/519.4 |
| 8,338,037 B2 | 12/2012 | Amine |
| 2007/0134554 A1* | 6/2007 | Armand .................. C01B 17/96 429/231.95 |
| 2009/0194746 A1 | 8/2009 | Nakaoka |
| 2009/0197173 A1 | 8/2009 | Nakaoka |
| 2011/0049420 A1 | 3/2011 | Ellenwood |
| 2011/0260099 A1* | 10/2011 | Paulsen ................ C01G 53/006 252/182.1 |
| 2012/0134914 A1* | 5/2012 | Paulsen .................... H01B 1/08 423/594.15 |
| 2013/0032753 A1 | 2/2013 | Yamamoto |
| 2013/0202502 A1 | 8/2013 | Schulz Dobrick |

FOREIGN PATENT DOCUMENTS

| | | |
|---|---|---|
| CN | 102790208 A | 11/2012 |
| JP | 9-245787 | 9/1997 |
| JP | 2013-075773 A | 4/2013 |
| KR | 10-2013-0043938 | 5/2013 |
| TW | 200941804 A | 10/2009 |
| WO | 2012095382 | 7/2012 |
| WO | 2013069454 | 4/2015 |

OTHER PUBLICATIONS

Guan, Xiantong, et al., "Enhancing the electrochemical performance of Li1.2Ni0.2Mn0.6O2 by surface modification with nickel-manganese composite oxide", Journal of Solid State Electrochemistry, Apr. 7, 2013, vol. 17, No. 7, pp. 2087-2093.

* cited by examiner

*Primary Examiner* — Douglas J McGinty
(74) *Attorney, Agent, or Firm* — Brinks Gilson & Lione (57) ABSTRACT

A carbonate precursor compound of a lithium manganese based oxide powder for a positive electrode of a rechargeable battery, the oxide having the general formula $Li_{1+\nu}M_{1-\nu}O_2$, wherein $-0.03 \leq \nu \leq 0.25$, wherein M is a composition comprising at least 50 mol % of manganese, and wherein the carbonate precursor compound has a secondary particle size D50 expressed in μm, and a tap density TD expressed in g/cm$^3$, with either $1 \leq TD \leq (2.78*D50)/(D50+7.23)$ and the compound having a particle size distribution having a span $S \leq 1.8$ with $S=(D90-D10)/D50$; or $1 \leq TD \leq (2.78*D50)/(D50+7.50)$.

17 Claims, 4 Drawing Sheets

CARBONATE PRECURSORS FOR HIGH LITHIUM AND MANGANESE CONTAINING CATHODE MATERIALS

This application is a National Stage application of International Application No. PCT/IB2014/064000, filed Aug. 21, 2014. This application also claims priority under 35 U.S.C. § 119 to European Application No. 13183081.2, filed Sep. 5, 2013 and European Application No. 14161878.5, filed Mar. 27, 2014.

TECHNICAL FIELD AND BACKGROUND

The invention relates to a carbonate precursor material of a lithium nickel manganese cobalt oxide with high lithium and manganese content, to be used as a cathode material for Li-ion batteries. The present invention aims at providing cathode materials which exhibit good electrochemical performances, by using certain carbonate precursors that are sintered with a lithium precursor for forming the cathode material.

In present and future applications, Li batteries with high energy density are needed. A high energy density can be achieved by cathodes having either one or (preferably) both of a high volumetric density and a high specific reversible discharge capacity. For a long time $LiCoO_2$ (or "LCO") was the dominating cathode material for rechargeable lithium batteries. LCO has a relatively high capacity (150-160 mAh/g when cycled at 3-4.3V) together with a high density (the true density is about 5.05 g/cm$^3$) and is relatively easy to produce. It has a relatively high Li diffusion, so it is possible to utilize large and dense particles (10-20 μm size) with a small surface area (0.1-0.5 m$^2$/g). These large, dense, low surface area particles can easily be prepared with a small amount of soluble surface base. These bases are originating mainly from two sources: first, impurities such as $Li_2CO_3$ and LiOH present in the $Li-M-O_2$; second, bases originating from ion exchange at the powder surface: $LiMO_2 + \delta H^+ \leftrightarrow Li_{1-\delta}H_\delta MO_2 + \delta Li^+$. All in all, commercial LCO is a robust and easy to manufacture cathode powder.

LCO however also has serious drawbacks. A main drawback is the relative scarcity of Co resources related to the relatively high cost of cobalt metal. Still worse, historically the cobalt price shows wild fluctuations, and these fluctuations possibly increased the need to find substitutes for $LiCoO_2$. The main substitute for LCO, which has emerged commercially within the last years, is lithium nickel manganese cobalt oxide. This material belongs to the ternary phase diagram of $LiMnO_2$—$LiNiO_2$—$LiCoO_2$. Additionally this composition can be modified by doping. It is known for example, that elements like Al, Mg, Ti and sometimes Zr can partly replace Co, Ni or Mn. Within the complex ternary phase diagram there is a wide degree of freedom to prepare electrochemically active phases with different composition and quite different performance.

As said above, a high volumetric density is easily obtained with relatively large, dense particles. A high specific capacity can be achieved with a lithium nickel manganese cobalt oxide having a high lithium and manganese content—this material being referred to as HLM, which is an oxide $Li-M-O_2$ with Li:M>1, where M (undoped)=$Ni_x Mn_y Co_{1-x-y}$ (x≥0, y≥0), and Mn:Ni>>1. The oxide can be conceived as a solid state solution of $Li_2MnO_3$ and $LiMO_2$. These compounds are sometimes considered to be nano-composites. A strict distinction between the compounds is not possible because a nano-composite is a solid state solution on atomic scale. Undoped HLM cathode materials have a very high capacity—up to 300 mAh/g. The 300 mAh/g is typically achieved after several activation cycles at a voltage of 4.6-4.8V and discharge to 2.0V. HLM cathode materials generally have a very poor electronic conductivity and slow lithium diffusion, and therefore are prepared as nano-structured or porous powders, making it very difficult to achieve a high tap density.

Generally, for the production of cathode materials with complex compositions, special precursors such as mixed transition metal hydroxides are used. The reason is that high performance $Li-M-O_2$ needs well mixed transition metal cations. To achieve this without "oversintering" (high temperature sintering for a longer period) the cathode precursors need to contain the transition metal in a well-mixed form (at atomic level) as provided in mixed transition metal hydroxides, carbonates etc. Mixed hydroxides or carbonates are typically prepared by precipitation reactions. Precipitation of mixed hydroxides (for example, the precipitation of a flow of NaOH with a flow of $M-SO_4$ under controlled pH) or mixed carbonates (for example, the precipitation of a flow of $Na_2CO_3$ with a flow of $M-SO_4$) allows precursors of suitable morphology to be achieved. A problem is the level of impurities; especially, the removal of sulfur is difficult and expensive. The sulphate impurity is suspected to cause (a) poor overcharge stability and (b) contribute to the highly undesired low Open Circuit Voltage (OCV) phenomena, where a certain fraction of batteries show a slow deterioration of OCV after initial charge. Sulphate impurities of up to 5 wt % are measured when using transition metal sulphate solutions in the manufacturing process, both for the precipitation of mixed hydroxides or carbonates.

In this regard, carbonate precursors are known from e.g. U.S. Pat. No. 7,767,189, disclosing a method for preparing lithium transitional metal oxides, comprising the steps of: preparing a carbonate precursor using the following sub steps: forming a first aqueous solution containing a mixture of at least two of the ions of the following metal elements ("$Me^{n+}$"): cobalt (Co), nickel (Ni), and manganese (Mn); forming a second aqueous solution containing ions of $CO_3^{2-}$; and mixing and reacting the first solution and the second solution to produce the carbonate precursor, $Ni_{1-x-y}Co_xMn_yCO_3$; and preparing the lithium transition metals oxide from the carbonate precursors using the following sub steps: evenly mixing $Li_2CO_3$ and the carbonate precursor; calcinating the mixed material in high temperature; and cooling and pulverizing the calcinated material to obtain the lithium transition metal oxide, $Li\ Ni_{1-x-y}Co_xMn_yO_2$. An aqueous solution containing ions of $CO_3^{2-}$ is disclosed in U.S. Pat. No. 8,338,037, where a Na containing transition metal composite cathode material is obtained when a (Na—Ni—Co—Mn)$CO_3$ precursor was prepared from a sodium-based carbonate precursor, such as $Na_2CO_3$, that undergoes precipitation, followed by simple washing with distilled water, and drying in an air blown oven at about 100° C. The precursors were then mixed with lithium sources and heated at 600° C., followed by re-calcinating at 900° C. in a muffle furnace.

An object of the present invention is to provide carbonate precursors useful as a raw material for producing a lithium nickel manganese cobalt oxide with high lithium and manganese compositions (HLM), where the HLM materials have a relative high tap density and a high capacity upon cycling in a battery.

SUMMARY OF THE INVENTION

Viewed from a first aspect, the invention can provide a carbonate precursor compound of a lithium manganese based oxide powder for a positive electrode of a rechargeable battery, the compound consisting of either one or more of a powderous non-sintered agglomerated M-, M-oxy-, M-hydroxy- and M-oxyhydroxy-carbonate, wherein $M=Ni_xMn_yCo_zA_aY_bZ_c(SO_4)_s$, Y being an alkali metal, Z being an anion different from sulphate, A being a dopant different from Y and Z, with $0 \le a \le 0.05$, $0.10 \le x \le 0.30$, $0.50 \le y \le 0.75$, $0 \le z \le 0.20$, x, y, z and a being expressed in mol with $a+x+y+z=1$; b, c and s being expressed in wt %; with $0 < b \le 1.5$, $0 < s \le 2.0$ and $0 \le c \le 1.0$, and wherein the carbonate precursor compound has a secondary particle size D50 expressed in μm, and a tap density TD expressed in g/cm³, with either (1) $1 \le TD \le (2.78*D50)/(D50+7.23)$ and the compound having a particle size distribution having a span $S \le 1.8$ with $S=(D90-D10)/D50$;

or (2) $1 \le TD \le (2.78*D50)/(D50+7.50)$. The latter condition is evidently more stringent than the former. In one embodiment $y > x*2$. In another embodiment $0.15 \le x \le 0.25$, $0.60 \le y \le 0.75$ and $0.05 \le z \le 0.20$. In still another embodiment Z is a nitrate or a fluoride, $c \le 0.5$, and preferably $c \le 0.3$. In still another embodiment Y=Na, $b \le 1.2$, and preferably $b \le 1.0$. In still another embodiment $s \le 1.7$ and preferably $s \le 1.5$. In this embodiment, it may be that $0.50 \le (b+s) \le 2.0$.

Figure 4:
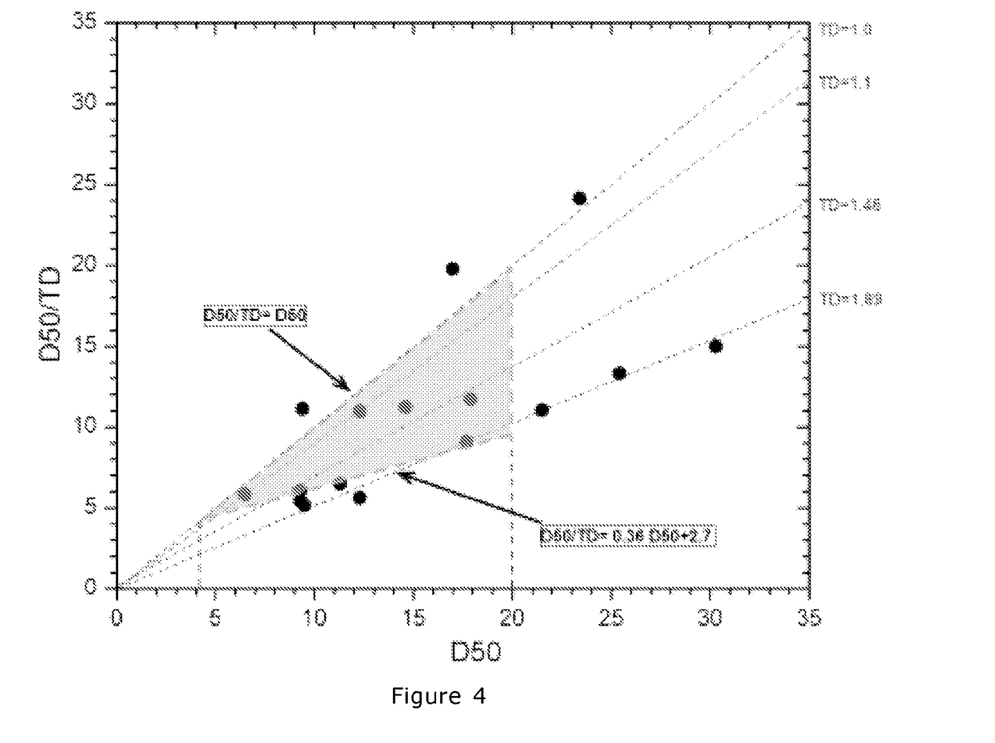
FIG. 4: Correlation between D50/TD and D50

In still another embodiment, 4.25 μm≤D50≤20 μm and TD≤2.0 g/cm³. It is not desirable to have a powder with a D50 above 20 μm, since the process to make such big particles tends to become unstable, and there is no real advantage to have such big particles for the further processing of the precursor and in the final lithiated product. In another embodiment, a density factor defined as D50/TD can be determined, and it falls in the range of $(0.36*D50+2.7) \le (D50/TD) \le D50$. As will be shown in the Examples, when the above mentioned limitations for the carbonate precursor are obeyed to, the lithium manganese based oxide powder for a positive electrode of a rechargeable battery prepared with this precursor has a superior discharge capacity. The correlation between D50 and D50/TD for these carbonate precursors is shown in FIG. 4.

In still another embodiment, the precursor has a BET value between 10 and 50 m²/g. In still another embodiment, A is either one or more of Mg, Al, Ti, Zr, Ca, Ce, Cr, W, Si, Fe, Nb, Sn, Zn, V and B. In a particular embodiment, the carbonate precursor compound has a particle size distribution having a span $S \le 1.7$, with $S=(D90-D10)/D50$. As the span of the lithiated product obtained from the carbonate precursor normally remains the same, it is highly desired that the span is as low as possible (for both precursor and final product). The reason is that during lithiation at high temperature, small particles tend to be overlithiated versus bigger particles because of the inhomogeneous carbonate and lithium salt blending, especially for the products having a high Li/M ratio (≥1.1). As a consequence, the bigger particles (coarse) are always under-lithiated and show a poorer cycling performance. In automotive applications, where a cycle stability of at least 5000 cycles is needed, the particles must be as uniform as possible, also in their Li/M ratio. This can be obtained by limiting the span of the precursor powder.

It is clear that further precursor compound embodiments according to the invention may be provided by combining individual features that are covered by the different embodiments described before.

The lithium manganese based oxide powder may have the general formula $Li_{1+v}M_{1-v}O_2$, wherein $-0.03 \le v \le 0.30$, preferably $0.18 \le v \le 0.25$, wherein M is a composition comprising at least 50 mol % of manganese.

It should be mentioned that in both US2009-197173 & US2009-194746 (having an identical description) examples are given of carbonate precursors having certain values for D50 and TD that may be related as in the present invention, however, these precursors contain less than 50% of Mn. Precursors containing more than 50% of Mn are not part of the invention in these patents, as they appear only in the comparative examples, and they have a relation between D50 and TD different from the present invention. In US2013-202502 carbonate precursors with high Mn content are disclosed. None of the exemplified precursors has the inventive combination of a relationship between D50 and TD and a low span of the present invention.

Viewed from a second aspect, the invention can provide the use of the carbonate precursor compound according to the invention in the manufacturing of a lithium manganese based oxide powder for a positive electrode of a rechargeable battery, the oxide powder having the general formula $Li_{1+v}M_{1-v}O_2$, wherein $-0.03 \le v \le 0.30$, and preferably $0.18 \le v \le 0.25$. In one embodiment, the lithium manganese based oxide (HLM) powder has a BET≥10 m²/g, and a TD≥1.2 g/cm³.

The carbonate precursor compound according to the invention may be obtained by conducting a precipitation by pumping into water:
- a feed solution that contains a Ni salt, a Mn salt and a Co salt,
- a carbonate solution that contains a metal carbonate or a metal bicarbonate, and
- a caustic solution that contains sodium-, potassium- or lithium hydroxide. This carbonate precursor has a specific surface area, tap density and particle size that are determined by the process conditions. The lithium nickel manganese cobalt oxide with high lithium and manganese content (HLM) obtained by using the carbonate precursor of the invention as raw material for producing the HLM is high in discharge capacity and acceptable in tap density; and a Li-ion battery that uses the HLM as the cathode electrode material exhibits excellent battery performances, and in particular a high energy density.

BRIEF DESCRIPTION OF THE DRAWINGS

| 1 | Water jacket | 2 | Overflow |
|---|---|---|---|
| 3 | Dosing tube | 4 | Motor |
| 5 | Impeller | 6 | pH senor |
| 7 | Baffle | 8 | Temperature sensor |
| 9 | Outlet valve | | |

DETAILED DESCRIPTION

In an embodiment of the invention, the carbonate precursor of the present invention is a composite carbonate that contains Ni, Co and Mn atoms, has an average particle size D50 of 4.25-20 μm and a tap density (TD) of 1.0 g/cm³ or more. The average particle size (D50) is preferably obtained by a laser particle size distribution measurement method. In this description, the laser particle size distribution measurement method is the Malvern® Mastersizer 2000. It should be emphasized that the electrochemical performance of the carbonate precursor according to the invention is actually determined by both TD and D50, and can be expressed by the density factor D50/TD, instead of only by TD independently.

The tap density (TD) measurement of the carbonate precursor in this invention is carried out by mechanically tapping a graduated measuring cylinder (100 ml) containing the precursor sample (having a mass W, around 60-120 g). After observing the initial powder volume, the measuring cylinder is mechanically tapped for 400 times, so that no further volume (V in $cm^3$) or mass (W) change is observed. The TD is calculated as TD=W/V.

The TD measurement is carried out on an ERWEKA® instrument.

In the carbonate precursor of the present invention, the ratio of the content of Mn atom to the content of Ni atom, i.e. the molar ratio of Mn to Ni atom content (Mn:Ni), is preferably 2.0 to 4.0, particularly preferably 2.5 to 3.5. The ratio of the concentration of the Ni ions to the concentration of Co ions, i.e. the molar ratio of Ni to Co atom concentration (Ni:Co), is preferably 1.0 to 3.0, particularly preferably 1.5 to 2.5.

The HLM cathode materials produced from the carbonate precursors according to the invention show both high Li-storage capacity and an acceptable tap density, which is favorable for practical battery applications. HLM cathode materials that are produced from precursor particles having a density factor D50/TD outside the range defined by the invention exhibit the disadvantages of either low Li-storage capacity or low tap density. It means that the electrochemical performance (e.g. reversible capacity, cycle ability) of the final cathode material is determined by the density factor D50/TD, instead of only by TD, particle size or surface area etc. independently. HLM cathode materials that are produced from precursor particles which are too dense, for example having a high TD and a small particle size, putting them outside the range determined by the main claim, will exhibit a low Li-storage capacity, compared with those carbonate precursor particles with comparable TD but having a larger particle size, according to the invention.

Next, a method for producing a carbonate precursor of the present invention is described. The composite carbonate may be obtained by conducting a co-precipitation reaction in a continuous stirred tank reactor (CSTR), by pumping into water a feed solution that contains a Ni salt, a Mn salt and a Co salt, a carbonate solution that contains a metal carbonate or a metal bicarbonate, and a caustic solution that contains sodium-, potassium- or lithium hydroxide. The kind of Ni salt in the feed solution is not particularly limited, as long as the Ni salt is water-soluble to yield a Ni ion-containing aqueous solution; examples of the Ni salts include the sulphate salt, the chloride salt, the nitrate salt and the acetate salt of Ni. Also, the kind of Mn salt in the feed solution is not particularly limited, as long as the Mn salt is water-soluble to yield a Mn ion-containing aqueous solution; examples of the Mn salts include the sulphate salt, the chloride salt, the nitrate salt and the acetate salt of Mn. Similarly, the kind of Co salt in the feed solution is not particularly limited, as long as the Co salt is water-soluble to yield a Co ion-containing aqueous solution; examples of the Co salts include the sulphate salt, the chloride salt, the nitrate salt and the acetate salt of Co.

The feed solution is an aqueous solution containing Ni salt, Mn salt and Co salt. In the feed solution, the content of Ni ions expressed in Ni atoms is preferably 0.1 to 1.0 mol/L and particularly preferably 0.2 to 0.8 mol/L, the content of Mn ions expressed in Mn atoms is preferably 0.5 to 2.0 mol/L and particularly preferably 0.8 to 1.5 mol/L, the content of Co ions expressed in Co atoms is preferably 0.05 to 1.0 mol/L and particularly preferably 0.1 to 0.5 mol/L. The concentration of the Ni ions, Mn ions and Co ion in the feed solution respectively falling within the above described ranges enable to get a balance between the product yield and the physiochemical properties of the obtained carbonate precursor. The total content of the anions of Ni, Mn and Co in the feed solution is preferably 1.0 to 3.0 mol/L and particularly preferably 1.5 to 2.5 mol/L. The molar ratios in the feed solution between Ni, Mn and Co atom concentrations falling within the above-described ranges further enhance the electrochemical performance of the final lithium metal oxide.

In the carbonate precursor of the present invention, A is a cation dopant different from Ni, Mn and Co, which may be selected from Mg, Al, Ti, Zr, Ca, Ce, Cr, W, Si, Fe, Nb, Sn, Zn, V and B. For cation doping (A element), the doping element is dissolved in the feed solution. The corresponding dopant salt in the feed solution is not particularly limited; as long as it is water-soluble to yield a dopant ion-containing aqueous solution; examples of the salts include the sulphate salt, the chloride salt, the nitrate salt and the acetate salt. The concentration of the dopant salt in the feed solution is determined from its desired content in the final carbonate precursor.

The carbonate solution contains any one or both of a metal carbonate and a metal bicarbonate. The carbonate solution is not particularly limited as long as the metal carbonate is water-soluble to yield a carbonate ion contained aqueous solution; examples of the metal carbonate include: alkaline metal carbonate such as sodium carbonate and potassium carbonate. The bicarbonate solution is not particular limited as long as it is water-soluble to yield a bicarbonate ion contained aqueous solution; examples of the metal bicarbonate include: alkaline metal bicarbonate such as sodium bicarbonate and potassium bicarbonate. Preferably the carbonate solution contains the cheap sodium carbonate, rendering the pH of the reaction solution nearly neutral.

In the carbonate solution, the concentration of carbonate or bicarbonate ions is preferably 1.0-4.0 mol/L and particularly preferably 1.5-3.0 mol/L. The concentration of the carbonate or bicarbonate ions in that range enables to produce good precursor and a final oxide with excellent electrochemical performances.

The caustic solution of the present invention may be a metal hydroxide solution. The caustic solution is not particular limited as long as the metal hydroxide is water-soluble to yield a caustic ion containing aqueous solution; examples of the metal hydroxide include: alkaline metal hydroxide such as lithium, sodium and potassium hydroxide. Preferable among these is lithium hydroxide and sodium hydroxide, rendering the pH of the reaction solution nearly neutral, whilst both are also relatively cheap. In the caustic solution, the concentration of hydroxide ions is preferably 5-15 mol/L and particularly preferably 8-10 mol/L. The concentration of the hydroxide ions in that range enables to produce good precursor and a final oxide with excellent electrochemical performances. For F doping, LiF can be added into the caustic solution, with a concentration of 0.1-5 g/L. For N doping, $LiNO_3$ may be added into the caustic solution, with a concentration of 1-10 g/L.

Figure 1:
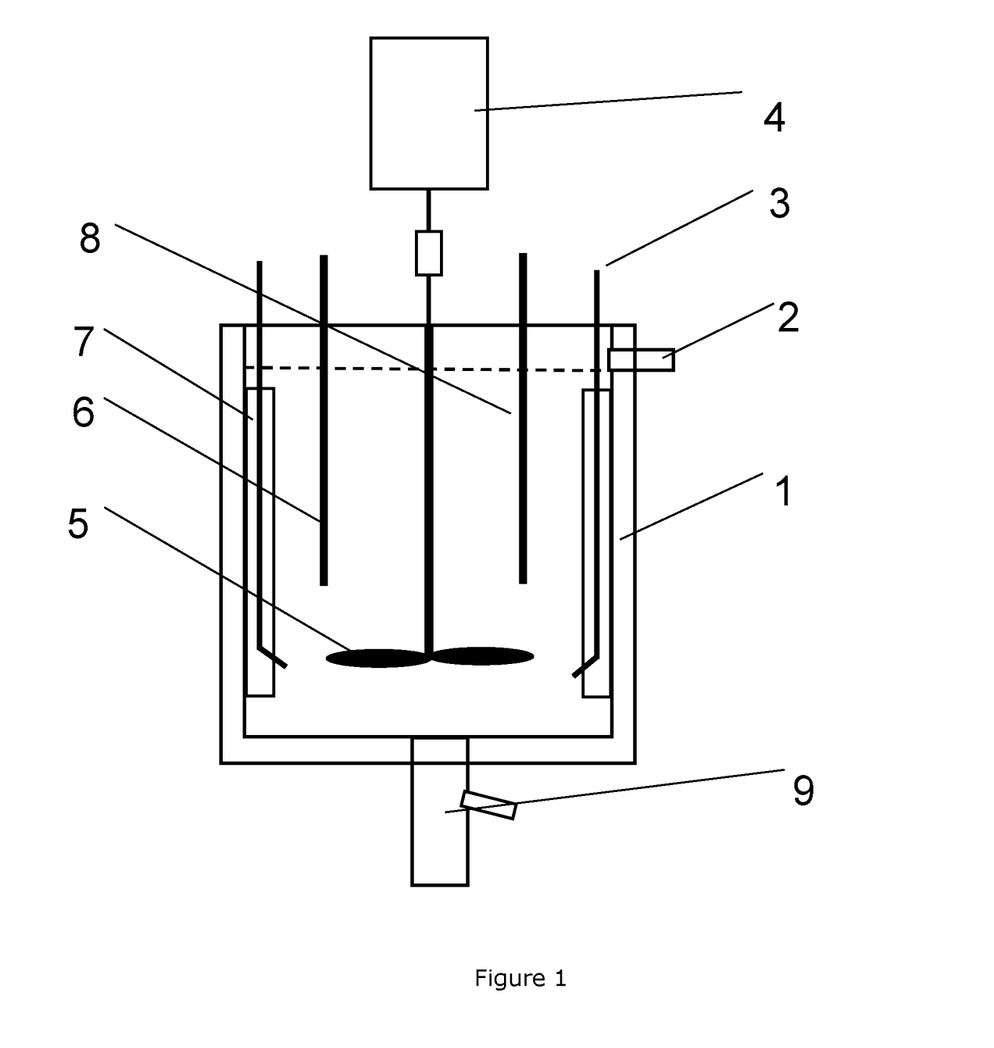
FIG. 1: design of a typical 10 L CSTR reactor.

In one embodiment, the carbonate precursor of the present invention is produced in a continuously stirred tank reactor (CSTR, such as described in http://encyclopedia.che.engin.umich.edu/Pages/Reactors/CSTR/CSTR.html) under a certain temperature, pH value and stirring speed. A typical structure and design of a 10 L CSTR reactor is shown in FIG. 1, with a diameter of 200 mm and height of 420 mm. Four baffles are installed in the reactor and a pitched-blade impeller is equipped on ⅓ of the height from the bottom. The dosing tubes are fixed on the baffles at the same height of the impeller. The stirring speed of the impeller is controlled by a motor above the CSTR reactor.

In the method for producing a carbonate precursor of the present invention, the feed solution, carbonate solution and metal hydroxide solution may be simultaneously or alternately pumped into water; while the water is being maintained at 20 to 95° C., and preferably at 25 to 90° C. The feed solution, caustic solution and carbonate solution are pumped into the CSTR reactor with a certain flow rate, e.g. $R_{feed}$, $R_{carbonate}$ and $R_{caustic}$, corresponding to the flow rate of feed solution, carbonate and caustic solution, respectively. The residence time Re is calculated by dividing the volume of the CSTR reactor (V) by the flow rate sum of the feed, carbonate and caustic solution; $Re=V/(R_{feed}+R_{carbonate}+R_{caustic})$. The residence time Re can thus be tuned by adapting the flow rate of feed solution, carbonate and caustic solution. The residence time Re of the present invention is set in the range of 1.5-6.0 hours, and preferably in the range of 2.0 to 4.0 hours. The reaction temperature T is set in the range of 20 to 95° C., and preferably at 30 to 90° C. The stirring speed in the CSTR reactor is set in the range of 500-2500 rpm, and preferably in the range of 800-2000 rpm.

The amount of the feed and carbonate solution added into the water is such that the ratio ($CO_3/M$) of the total number of the carbonate ions to the total number of moles (M) of Ni, Mn, Co and A ions added from the feed solution is preferably 0.9 to 1.2, and particularly preferably 0.95 to 1.1. The ratio ($HCO_3/M$) of the total number of the moles ($HCO_3$) present in bicarbonate ions in the reaction to the total number of moles (M) of Ni, Mn and Co ions added from the feed solution is preferably 1.8 to 2.3, and particularly preferably 1.9 to 2.2. The amount of the carbonate/bicarbonate solution and hydroxide solution added into the water are such that the ratio ($OH/CO_3$) of the total number of moles (OH) added in the hydroxide solution to the total number of the moles ($CO_3$) present in the carbonate ion or bicarbonate ions in the reaction is preferably less than 0.1, and particularly preferably less than 0.05. Similarly, $OH/HCO_3$ is preferably less than 0.1, and particularly preferably less than 0.05.

Figure 5:
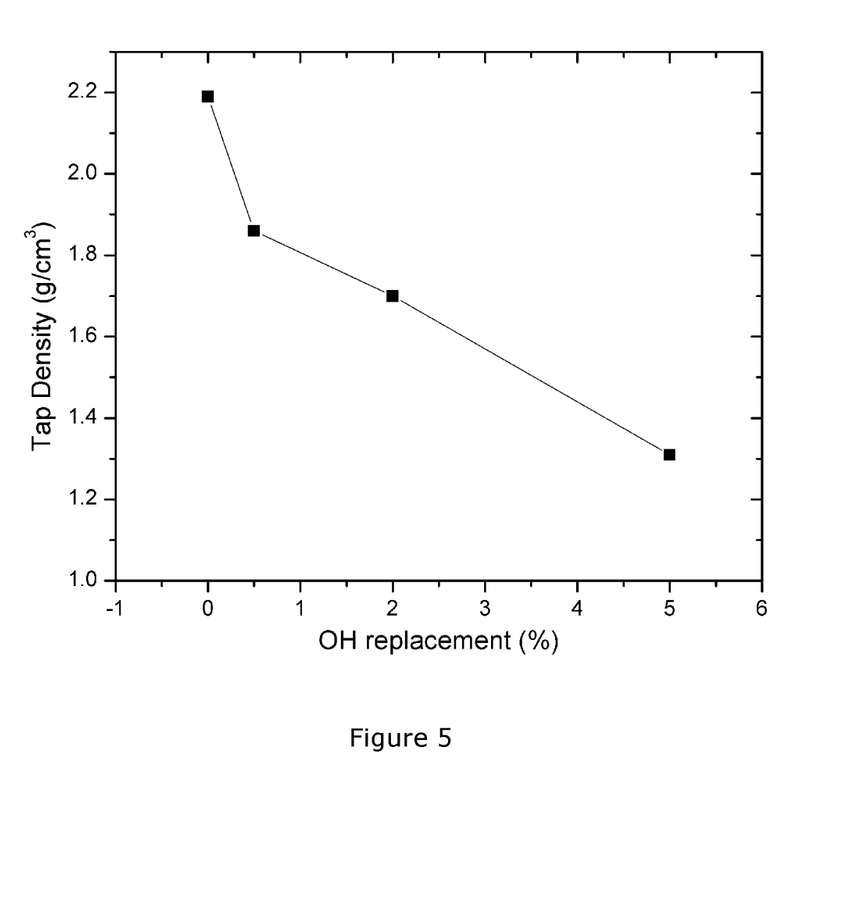
FIG. 5: Variation of tap density (TD) versus the OH replacement (molar %) in $Na_2CO_3$ solution

As it is described above, in order to achieve a good electrochemical performance, the tap density of the carbonate precursor in this invention may fall in the range of $1 \leq TD \leq (2.78*D50)/(D50+7.23)$. If the tap density of the carbonate precursor is too high, it has a negative impact on the capacity and cycle performance after the carbonate precursor is lithiated. One of the feasible strategies to decrease the tap density of the carbonate precursor is to replace part of the $Na_2CO_3$ by NaOH during the precipitation. After a certain amount of NaOH is introduced into the precipitation, a porous carbonate precursor with lower tap density can be produced. The amount of the carbonate/bicarbonate solution and hydroxide solution added into the water are such that the ratio ($OH/CO_3$) of the total number of moles (OH) added in the hydroxide solution to the total number of the moles ($CO_3$) present in the carbonate or bicarbonate ions in the reaction is preferably less than 0.1, and particularly preferably less than 0.05. Similarly, $OH/HCO_3$ is preferably less than 0.1, and particularly preferably less than 0.05. The correlation between tap density and NaOH replacement percentage is shown on FIG. 5.

As is described in literature, the carbonate precipitation process is mainly controlled by the following parameters:
Stirring speed of impeller
Temperature
Residence time
NaOH concentration
pH
Metal concentration
$CO_3/M$ molar ratio
$OH/CO_3$ molar ratio.

The carbonate precursors according to the invention can be produced by tuning these parameters in the ranges as described above.

Figure 2:
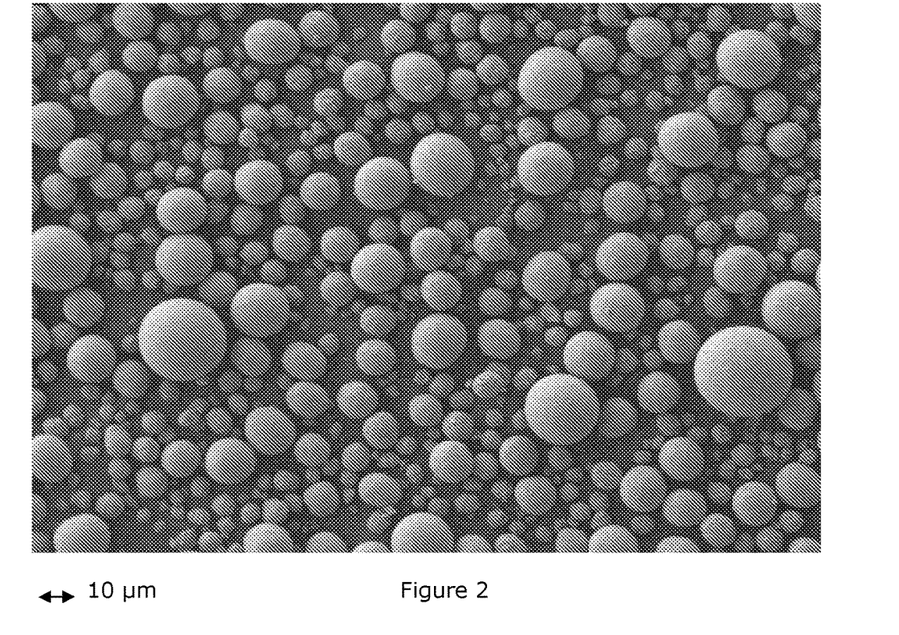
FIG. 2: SEM images (500× magnification) of the carbonate precursor in Example 1
Figure 3:
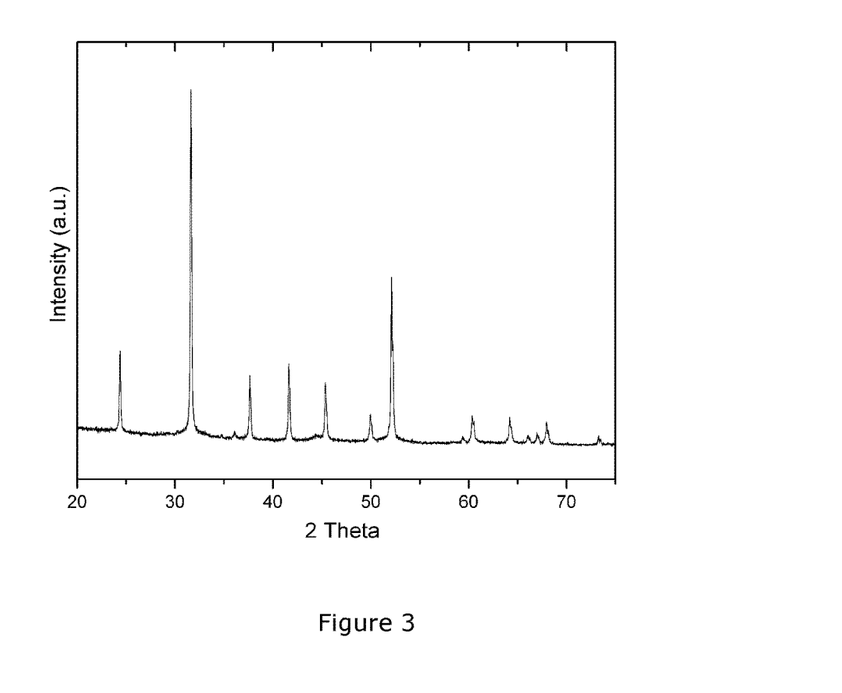
FIG. 3: XRD pattern of the carbonate precursor in Example 1

The carbonate precursor slurry is collected from the overflow of the CSTR reactor and the precursor particles are obtained by a solid-liquid separation process, for example, press filtration or continuous centrifugal filtration. The solid-liquid separation process will be finished until the conductivity of the filter/centrifuge waste water is lower than 20 $\rho S/m$. The thus obtained particles are dried, pulverized and classified to yield the carbonate precursor of the present invention. The typical scan electron microscopy images and XRD pattern of the as-prepared carbonated precursor having a correlation between TD and D50 falling in the range of $1 \leq TD \leq (2.78*D50)/(D50+7.50)$ are shown in FIG. 2 and FIG. 3, respectively.

The lithium nickel manganese cobalt oxide with high manganese concentration (HLM) represented by the above-described general formula is produced by mixing the carbonate precursor of the present invention with a lithium compound and by sintering the thus obtained mixture. The amount of the lithium compounds added is such that the ratio (Li/M) of the number of moles of the lithium atoms in the lithium compound to the total number of moles (M) of the Ni, Mn, Co and A atoms included in the carbonate precursor is preferably 1.2-1.60, and more preferably 1.35-1.55. The sintering atmosphere is not particularly limited; the sintering may be conducted under air or in an oxygen atmosphere, for example as a multiple stage sintering. The sintering conditions are such that the baking temperature is 500-1100° C., preferably 800 to 1000° C., and the sintering time is 5 hours or more, preferably 10 to 24 hours.

Generally speaking, the TD of the HLM cathode material after lithiation will be 0.2-0.4 $g/cm^3$ higher than that of the corresponding carbonate precursor. For example, if the TD of a carbonate precursor is 1.5 $g/cm^3$, its TD will be higher than 1.7 $g/cm^3$ after sintering with $Li_2CO_3$ at high temperature. Even then, the HLM cathode produced from carbonate with too low TD (lower than 1.0 $g/cm^3$) will result in low cathode packing density in a Li-ion battery, which will decrease its volumetric energy density. On the other hand, the HLM cathodes produced from carbonate precursor with too high TD (higher than 2.0 $g/cm^3$) always show poor electrochemical performance (eg. Li-storage capacity, cycle capability and rate performance etc). So, the electrochemical performance of HLM is actually determined by both TD and D50 of the precursor (density factor D50/TD), instead of only by TD independently.

After sintering, by appropriately cooling and by pulverizing and classifying where necessary, there can be obtained a lithium nickel manganese cobalt oxide with high manganese concentration (HLM) having a BET specific surface area as high as 10 $m^2/g$ or more and a tap density as high as 1.0 g/cm³ or more. Such a HLM material is suitable to use as a cathode material of a Li-ion battery.

The invention is further illustrated in the following examples:

Example 1

Preparation of feed solution: NiSO₄, MnSO₄, CoSO₄ and MgSO₄ are dissolved in deionized water and a transition metal solution is prepared, with a concentration of Ni, Mn, Co and Mg of 0.44 mol/L, 1.34 mol/L, 0.22 mol/L, and 0.10 mol/L, respectively. For preparing the carbonate solution Na₂CO₃ is dissolved in deionized water and a 1.65 mol/L Na₂CO₃ solution is obtained. For preparing the hydroxide solution NaOH is dissolved in deionized water and a 10 mol/L NaOH solution is obtained.

The feed, carbonate and hydroxide solution are pumped into a 10 L CSTR (see FIG. 1) reactor. The molar ratio of CO₃:Metal=1.0 and the molar ratio of OH:CO₃=0.04, the residence time is set at 3 hours. The feed solution, carbonate solution and hydroxide solution are continuously pumped into the CSTR reactor set at a precipitation temperature of 90° C., with an impeller stirring speed at 1000 rpm.

The carbonate precursor slurry is collected through the overflow of the CSTR reactor. Then, the obtained precursor slurry is solid-liquid separated by a press filter and washed with deionized water for several times until the conductivity of the filter water is lower than 20 ρS/m. The thus obtained carbonated precursor wet cake is dried in an oven at 150° C. for 24 hours. The TD and D50 of the obtained carbonate precursor are 1.53 g/cm³ and 9.3 μm, respectively. The calculated density factor (D50/TD) value is 6.1, which is higher than the (0.36*D50+2.7) value (6.05) but lower than the D50 value (9.3). Also, the TD value falls in the range of 1 TD (2.78*D50)/(D50+7.50). This precursor shows a BET value of 14.2 m²/g and a span of 1.67. The SO₄ and Na impurities content in this carbonate precursor are 1.23 wt % and 0.41 wt %, respectively.

Then this carbonate precursor is sintered with Li₂CO3 at a molar ratio of Li/M=1.50 at 950° C., to form HLM cathode material. After sintering, the TD of HLM increases to 1.85 g/cm³ and the span (S=(D90−D10)/D50) remains the same as the carbonate precursor. The lithiated H LM cathode material shows a discharge capacity of 301 mAh/g when cycled between 4.6-2.0 V under 0.05 C rate.

Comparative Example 1

The same solution concentrations as in Example 1 are used. The precipitation temperature is maintained at 80° C. and the residence time in the CSTR reactor is increased up to 3.5 hours. In addition, the impeller's rotating speed is increased to 1500 rpm. The other precipitation parameters are as in Example 1. As is known by the skilled person, this change in parameters will lead to an increase in tap density. The TD and D50 of the obtained carbonate precursor are 1.70 g/cm³ and 9.3 μm, respectively. The density factor (D50/TD) value is 5.4, which is lower than the (0.36*D50+2.7) value (6.05). Also, the TD is beyond the (2.78*D50)/(D50+7.50) value (1.54). This precursor shows a BET value of 14.8 m²/g. The SO₄ and Na impurities content in this carbonate precursor are 1.02 wt % and 0.45 wt %, respectively.

Then this carbonate precursor is sintered with Li₂CO₃ at a molar ratio of Li/M=1.50 under 950° C., to form HLM cathode material. After sintering, the TD of HLM increases to 2.2 g/cm³. This HLM cathode material shows a discharge capacity of 251 mAh/g when cycled between 4.6-2.0 V, which is much lower than Example 1. This is because the precursor collected under the above precipitation conditions is too dense, compared to the precursor collected in Example 1.

Example 2

Preparation of feed solution: NiSO₄, MnSO₄ and CoSO₄ are dissolved in deionized water and a transition metal solution is prepared, with a concentration of Ni, Mn and Co of 0.35 mol/L, 1.45 mol/L and 0.20 mol/L respectively. For preparing the carbonate solution Na₂CO₃ is dissolved in deionized water and a 1.65 mol/L Na₂CO₃ solution is obtained. For preparing the hydroxide solution NaOH and NaF are dissolved in deionized water and a 10 mol/L NaOH and 4 g/L NaF solution is obtained.

After pumping the feed solution, carbonate solution and hydroxide solution into a CSTR reactor a residence time of 3.5 hours is applied. The molar ratio of CO₃:Metal=1.03, and the molar ratio of OH:CO₃=0.01. The feed solution, carbonate solution and hydroxide solution are continuously pumped into the CSTR reactor and the precipitation temperature is maintained at 80° C., with a stirring speed at 1000 rpm. The carbonate precursor slurry is collected through the overflow of the CSTR reactor. Then, the obtained precursor slurry is solid-liquid separated by a press filter and washed with deionized water for several times until the conductivity of the filter water is lower than 20 μS/m. The thus obtained carbonated precursor wet cake is dried in an oven at 150° C. for 24 hours.

The TD and D50 of the obtained carbonate precursor are 1.2 g/cm³ and 12.3 μm, respectively. So, the D50/TD value is 11.0, which is higher than the (0.36*D50+2.7) value (7.13) but lower than the D50 value (12.3). Also, the TD falls in the range of 1≤TD≤(2.78*D50)/(D50+7.50). This precursor shows a BET value of 31 m²/g and a span of 1.53. The SO₄ and Na impurities content in this carbonate precursor are 0.06 wt % and 0.81 wt %, respectively.

Then this carbonate precursor is sintered with Li₂CO₃ at a molar ratio of Li/M=1.45 at 950° C., to form HLM cathode material. After sintering, the TD of HLM increases to 1.5 g/cm³ and the span remains the same as the carbonate precursor. This HLM cathode material shows a discharge capacity of 281 mAh/g when cycled between 4.6-2.0 V, at a 0.05 C rate.

Comparative Example 2

The same solution concentrations as in Example 2 were prepared. The precipitation temperature is maintained at 90° C. and the residence time is increased up to 4 hours. In addition, the stirring speed is increased to 2000 rpm. The other precipitation parameters are the same as in Example 2. The TD and D50 of obtained carbonate precursor are 2.2 g/cm³ and 12.3 μm, respectively. So, the D50/TD value is 5.6, which is lower than the (0.36*D50+2.7) value (7.13). Also, the TD is beyond the (2.78*D50)/(D50+7.50) value (1.73). This precursor shows a BET value of 27 m²/g. The SO₄ and Na impurities content in this carbonate precursor are 1.56% and 0.3%), respectively.

Then this carbonate precursor is sintered with Li₂CO₃ at a molar ratio of Li/M=1.45 at 950° C., to form HLM cathode material. After sintering, the TD of HLM increases to 2.4 g/cm³. This HLM cathode material shows a discharge capacity of 268 mAh/g when cycled between 4.6-2.0 V, at a rate of 0.05 C, which is much lower than Example 2. This is because the precursor collected under such precipitation conditions is too dense, compared with the carbonate precursor collected in Example 2.

Example 3

Preparation of feed solution: $NiSO_4$, $MnSO_4$ and $CoSO_4$ are dissolved in deionized water and a transition metal solution is prepared, with a concentration of Ni, Mn and Co of 0.54 mol/L, 1.24 mol/L and 0.20 mol/L, respectively. For preparing the carbonate solution $Na_2CO_3$ is dissolved in deionized water and a 1.65 mol/L $Na_2CO_3$ solution is obtained. For preparing the hydroxide solution NaOH is dissolved in deionized water and a 10 mol/L NaOH solution is obtained. After pumping the feed solution, carbonate solution and hydroxide solution into a CSTR reactor a residence time of 3 hours is applied. The molar ratio of $CO_3$:Metal=0.99 and the molar ratio of $OH:CO_3$=0.05. The feed solution, carbonate solution and hydroxide solution are continuously pumped into the CSTR reactor and the precipitation temperature is maintained at 90° C., with a stirring speed of 1000 rpm.

The carbonate precursor slurry is collected through the overflow of the CSTR reactor. Then, the obtained precursor slurry is solid-liquid separated by a press filter and washed with deionized water for several times until the conductivity of the filter water is lower than 20 μS/m. The thus obtained carbonated precursor wet cake is dried in an oven at 150° C. for 24 hours. The TD and D50 of the obtained carbonate precursor are 1.53 g/cm³ and 17.9 μm, respectively. So, the D50/TD value is 11.7, which is higher than the (0.36*D50+2.7) value (9.14) but lower than the D50 value (17.9). Also, the TD falls in the range of 1≤TD≤(2.78*D50)/(D50+7.50). This precursor shows a BET value of 37 m²/g and a span of 1.42. The $SO_4$ and Na impurities content in this carbonate precursor are 0.08 wt % and 0.6 wt %, respectively.

Then this carbonate precursor is sintered with $Li_2CO_3$ at a molar ratio of Li/M=1.40 at 950° C., to form HLM cathode material. After sintering, the TD of HLM increases to 1.8 g/cm³ and the span remains the same as the carbonate precursor. This HLM cathode material shows a discharge capacity of 315 mAh/g when cycled between 4.6-2.0 V at a rate of 0.05 C.

Comp. Example 4

Preparation of feed solution: $NiSO_4$, $MnSO_4$, $CoSO_4$ and $MgSO_4$ are dissolved in deionized water and a transition metal solution is prepared, with a concentration of Ni, Mn and Co and Mg of 0.44 mol/L, 1.34 mol/L and 0.22 mol/L, respectively. For preparing the carbonate solution $Na_2CO_3$ is dissolved in deionized water and a 1.65 mol/L $Na_2CO_3$ solution is obtained. The feed and carbonate solution are pumped into a 10 L CSTR reactor. The molar ratio of $CO_3$:Metal=1.0 and the residence time is set at 3 hours. The feed and carbonate solution are continuously pumped into the CSTR reactor set at a precipitation temperature of 70° C., with an impeller stirring speed at 600 rpm.

The carbonate precursor slurry is collected through the overflow of the CSTR reactor. Then, the obtained precursor slurry is solid-liquid separated by a press filter and washed with deionized water for several times until the conductivity of the filter water is lower than 20 ρS/m. The thus obtained carbonated precursor wet cake is dried in an oven at 150° C. for 24 hours. The TD and D50 of the obtained carbonate precursor are 0.85 g/cm³ and 9.4 μm, respectively. The calculated density factor (D50/TD) value is 11.1, which is higher than the (0.36*D50+2.7) value (6.08) and the D50 value (9.4). Also, the TD value out of the range of 1≤TD≤ (2.78*D50)/(D50+7.50). This precursor shows a BET value of 19.2 m²/g and a span of 1.92. The $SO_4$ and Na impurities content in this carbonate precursor are 1.92 wt % and 0.34 wt %, respectively.

Then this carbonate precursor is sintered with $Li_2CO_3$ at a molar ratio of Li/M=1.44 at 950° C., to form HLM cathode material. After sintering, the TD of HLM increases to 0.98 g/cm³ and the span remains the same as the carbonate precursor. The lithiated HLM cathode material shows a discharge capacity of 278.1 mAh/g when cycled between 4.6-2.0 V under 0.05 C rate.

Comp. Example 5

The same solution concentrations as in Comp. Example 4 are prepared. The precipitation temperature is maintained at 90° C. and the stirring speed is increased to 2000 rpm. The carbonate precursor slurry is collected through the overflow of the CSTR reactor. Then, the obtained precursor slurry is solid-liquid separated by a press filter and washed with deionized water for several times until the conductivity of the filter water is lower than 20 μS/m. The thus obtained carbonated precursor wet cake is dried in an oven at 150° C. for 24 hours. The TD and D50 of the obtained carbonate precursor are 1.74 g/cm³ and 11.3 μm, respectively. The calculated density factor (D50/TD) value is 6.5, which is lower than the (0.36*D50+2.7) value (6.77) and the D50 value (11.3). Also, the TD value out of the range of 1≤TD≤ (2.78*D50)/(D50+7.50). This precursor shows a BET value of 20.5 m²/g and a span of 1.65. The $SO_4$ and Na impurities content in this carbonate precursor are 1.92 wt % and 0.34 wt %, respectively.

Then this carbonate precursor is sintered with $Li_2CO_3$ at a molar ratio of Li/M=1.43 at 950° C., to form HLM cathode material. After sintering, the TD of HLM increases to 1.82 g/cm³ and the span remains the same as the carbon precursor. The lithiated HLM cathode material shows a discharge capacity of 189.6 mAh/g when cycled between 4.6-2.0 V under 0.05 C rate.

The physical properties of each of the thus obtained carbonate precursor were measured in the same manner as described above, and the results thus obtained are shown in Table 1.

TABLE 1

(all data are for the precursor compound, except the discharge capacity which is measured on the final cathode material)

| Sample | D50 (μm) | D50/ TD | (2.78*D50)/ (D50 + 7.50) | TD (g/cm³) | BET (m²/ g) | Discharge capacity (mAh/g) | Span |
|---|---|---|---|---|---|---|---|
| Example 1 | 9.3 | 6.1 | 1.54 | 1.53 | 14.2 | 301.2 | 1.67 |
| Comp. Ex 1 | 9.3 | 5.4 | 1.54 | 1.7 | 14.8 | 251.4 | 1.64 |
| Example 2 | 12.3 | 11.0 | 1.72 | 1.2 | 31 | 280.8 | 1.53 |
| Comp. Ex 2 | 12.3 | 5.6 | 1.72 | 2.2 | 27 | 267.7 | 1.59 |
| Example 3 | 17.9 | 11.7 | 1.96 | 1.53 | 37 | 315.4 | 1.42 |
| Comp. Ex 4 | 9.4 | 11.1 | 1.55 | 0.85 | 19.2 | 278.1 | 1.92 |
| Comp. Ex 5 | 11.3 | 6.5 | 1.67 | 1.74 | 20.5 | 189.6 | 1.65 |

The invention claimed is:

1. A carbonate precursor compound for preparing a lithium manganese based oxide powder for a positive electrode of a rechargeable battery, the compound comprising one or more of a powderous non-sintered agglomerated M-carbonate, M-oxy-carbonate, M-hydroxy-carbonate or M-oxyhydroxy-carbonate, wherein $M=Ni_xMn_yCo_zA_aY_bZ_c(SO_4)_s$, Y being an alkali metal, Z being an anion different from sulphate, A being a dopant different from Y and Z, with $0 \leq a \leq 0.05$, $0.10 \leq x \leq 0.30$, $0.50 \leq y \leq 0.75$, $0 \leq z \leq 0.20$, x, y, z and a being expressed in mol with $a+x+y+z=1$; b, c and s being expressed in wt %; with $0 < b \leq 1.5$, $0 < s \leq 2.0$ and $0 \leq c \leq 1.0$; wherein the compound has a secondary particle size D50 expressed in µm, and a tap density TD expressed in g/cm³, wherein $1 \leq TD \leq (2.78*D50)/(D50+7.23)$ and the compound having a particle size distribution having a span $S \leq 1.8$ with $S=(D90-D10)/D50$.

2. The carbonate precursor compound of claim 1, wherein $y > x*2$.

3. The carbonate precursor compound of claim 2, wherein $0.15 \leq x \leq 0.25$, $0.60 \leq y \leq 0.75$ and $0.05 \leq z \leq 0.20$.

4. The carbonate precursor compound of claim 1, wherein Z is a nitrate or a fluoride, and $c \leq 0.5$.

5. The carbonate precursor compound of claim 1, wherein Y=Na, and $b \leq 1.2$.

6. The carbonate precursor compound of claim 1, wherein $s \leq 1.7$.

7. The carbonate precursor compound of claim 6, wherein $0.50 \leq (b+s) \leq 2.0$.

8. The carbonate precursor compound of claim 1, wherein $4.25 \ \mu m \leq D50 \leq 20 \ \mu m$ and $TD \leq 2.0 \ g/cm^3$.

9. The carbonate precursor compound of claim 1, having a BET value between 10 and 50 m²/g.

10. The carbonate precursor compound of claim 1, wherein A is selected from the group consisting of one or more of Mg, Al, Ti, Zr, Ca, Ce, Cr, W, Si, Fe, Nb, Sn, Zn, V and B.

11. The carbonate precursor compound of claim 1, wherein the compound has a particle size distribution having a span $S \leq 1.7$, with $S=(D90-D10)/D50$.

12. The carbonate precursor compound of claim 1, wherein the lithium manganese based oxide powder has the general formula $Li_{1+v}M_{1-v}O_2$, wherein $-0.03 \leq v \leq 0.30$, wherein M is a composition comprising at least 50 mol % of manganese.

13. A carbonate precursor compound for preparing a lithium manganese based oxide powder for a positive electrode of a rechargeable battery, the compound comprising one or more of a powderous non-sintered agglomerated M-carbonate, M-oxy-carbonate, M-hydroxy-carbonate, or M-oxyhydroxy-carbonate, wherein $M=Ni_xMn_yCo_zA_aY_bZ_c(SO_4)_s$, Y being an alkali metal, Z being an anion different from sulphate, A being a dopant different from Y and Z, with $0 \leq a \leq 0.05$, $0.10 \leq x \leq 0.30$, $0.50 \leq y \leq 0.75$, $0 \leq z \leq 0.20$, x, y, z and a being expressed in mol with $a+x+y+z=1$; b, c and s being expressed in wt %; with $0 < b \leq 1.5$, $0 < s \leq 2.0$ and $0 \leq c \leq 1.0$; wherein the compound has a secondary particle size D50 expressed in µm, and a tap density TD expressed in g/cm³, wherein $1 \leq TD \leq (2.78*D50)/(D50+7.50)$.

14. The carbonate precursor compound of claim 13, wherein $0.15 \leq x \leq 0.25$, $0.60 \leq y \leq 0.75$ and $0.05 \leq z \leq 0.20$.

15. The carbonate precursor compound of claim 13, wherein $4.25 \ \mu m \leq D50 \leq 20 \ \mu m$ and $TD \leq 2.0 \ g/cm^3$.

16. The carbonate precursor compound of claim 13, having a BET value between 10 and 50 m²/g.

17. The carbonate precursor compound of claim 13, wherein A is selected from the group consisting of one or more of Mg, Al, Ti, Zr, Ca, Ce, Cr, W, Si, Fe, Nb, Sn, Zn, V and B.

* * * * *